UNITED STATES PATENT OFFICE.

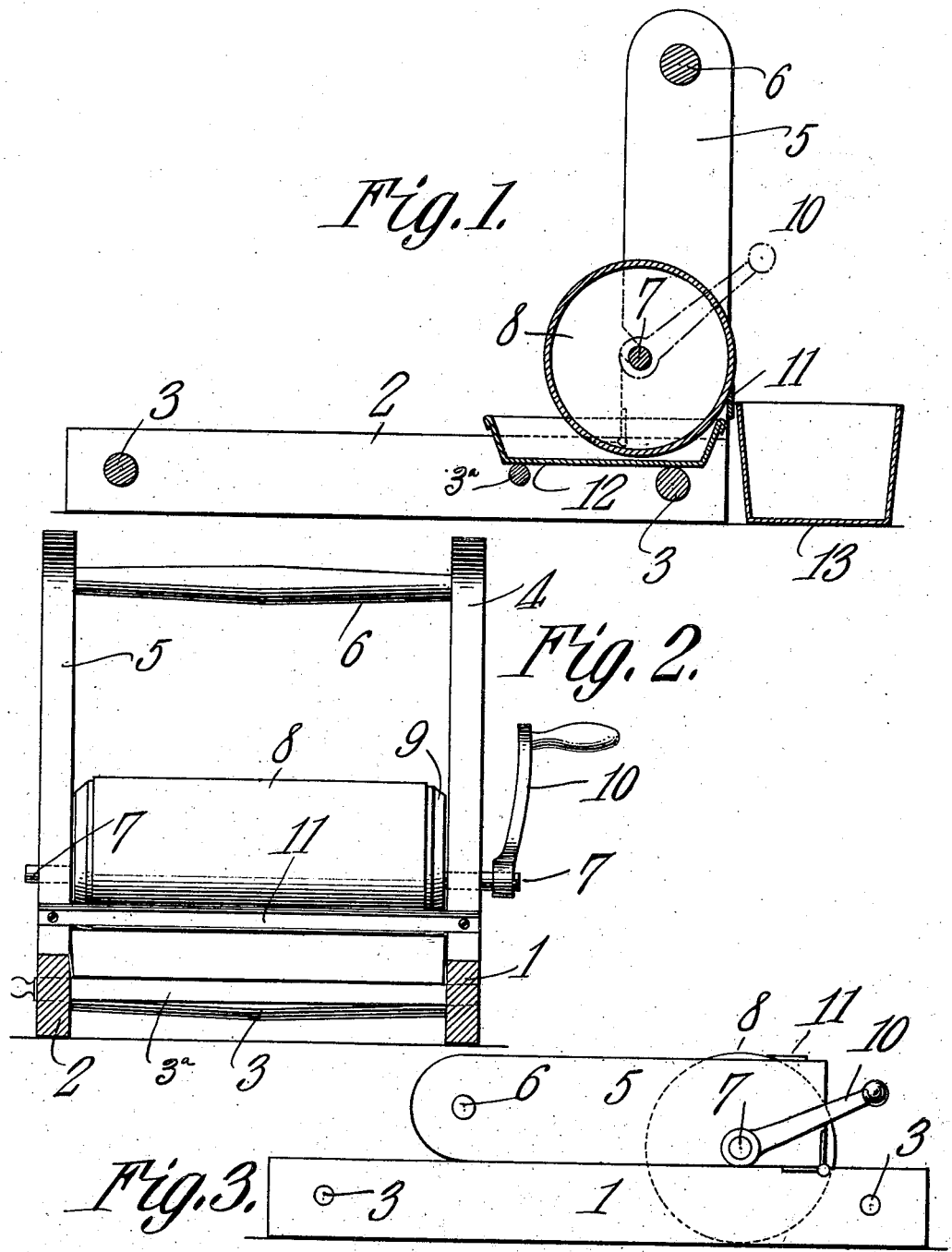

CHARLES F. BARRY, OF WARREN, NEW HAMPSHIRE.

ICE-CREAM FREEZER.

No. 896,077.  Specification of Letters Patent.  Patented Aug. 18, 1908.

Application filed July 13, 1907. Serial No. 383,677.

*To all whom it may concern:*

Be it known that I, CHARLES F. BARRY, a citizen of the United States, residing at Warren, in the county of Grafton and State of New Hampshire, have invented a new and useful Ice-Cream Freezer, of which the following is a specification.

This invention relates to an apparatus for refrigerating liquids, and comprises a foldable frame, which when opened out, will give support to a horizontally journaled refrigerating cylinder arranged to project into a pan containing liquid material to be frozen, which latter adheres to the cylinder as it is turned until brought against a knife edge and removed, falling thence into a suitable receptacle to be afterwards collected, packed and stored until wanted.

In the accompanying drawings: Figure 1 is a central longitudinal sectional view of the apparatus. Fig. 2 is an elevation of the delivery side. Fig. 3 is a side view of the apparatus folded.

Similar reference numerals are used for the same parts on all the figures.

The base frame is made of two parallel longitudinal bars 1 and 2 connected by two cross braces 3. The bars 1 and 2 which stand on edge have hinged on their top edges two uprights 4 and 5 connected at their upper ends by a cross brace 6. The inner edges of the uprights 4 and 5 are notched a proper distance above the bars 1 and 2 to form bearings for a shaft 7 projecting from the ends of a cylinder 8 made preferably of metal with a smooth periphery, a fixed bottom and a liquid-tight removable closure 9. A handle 10 on the shaft 7 is used for turning the cylinder. Screwed on the back of the uprights 4 and 5 in a horizontal position is a knife 11 its edge just skimming the cylinder 8 when the latter is rotated, while below the cylinder and supported on the frame is a pan 12 or receptacle for liquid to be frozen. Near the knife but outside the apparatus is a second pan 13 to receive the frozen substance.

When it is desired to use an apparatus of this type, for making ice cream as an example, the cylinder is filled with a refrigerating mixture, such as ice or snow and salt and the prepared cream poured into the pan 12 which rests upon one of the cross braces 3 and a removable rod $3^a$, or any other form of support. When the temperature of the cylinder falls sufficiently low the cylinder is turned slowly and the cream freezing on its periphery as it passes through the pan is scraped off by the knife 11 and falls into the receptacle 13 to be packed and stored until called for.

When not in use the apparatus can be folded as represented in Fig. 3 and put out of the way, the pan 12 being first removed from the apparatus by lifting the cylinder from its bearings, or raising the inner side of the pan and withdrawing it. The rod $3^a$ or other support is also withdrawn.

Having thus described the invention what is claimed is:—

A liquid freezer comprising a base frame, an upright frame hinged thereto and adapted to fold thereon, a refrigerating cylinder journaled in the upright frame, a scraping knife fixed also to said frame, a removable liquid container below the cylinder and a receptacle for the frozen material.

In testimony that I claim the foregoing as my own, I have hereto affixed my signature in the presence of two witnesses.

CHARLES F. BARRY.

Witnesses:
 LIEGA CLEMENT,
 GEO. M. WILLIAMS.